United States Patent
Ding et al.

(10) Patent No.: US 10,218,766 B2
(45) Date of Patent: Feb. 26, 2019

(54) METHOD OF SERVICE CAPABILITY NOTIFICATION

(71) Applicant: Futurewei Technologies, Inc., Plano, TX (US)

(72) Inventors: Xinmin Ding, San Jose, CA (US); Yilin Gan, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 491 days.

(21) Appl. No.: 14/532,503

(22) Filed: Nov. 4, 2014

(65) Prior Publication Data
US 2016/0127510 A1  May 5, 2016

(51) Int. Cl.
*H04L 29/06* (2006.01)
*H04L 29/08* (2006.01)

(52) U.S. Cl.
CPC .......... *H04L 67/02* (2013.01); *H04L 65/1006* (2013.01); *H04L 65/4069* (2013.01); *H04L 67/16* (2013.01)

(58) Field of Classification Search
USPC .................................................. 709/200, 203
See application file for complete search history.

(56) References Cited

U.S. PATENT DOCUMENTS

2011/0041171 A1* 2/2011 Burch .................. H04L 63/08
726/7

2015/0026237 A1* 1/2015 Kaplinger .......... G06F 17/30174
709/203
2015/0134729 A1* 5/2015 Lim ..................... H04L 67/02
709/203
2015/0280963 A1* 10/2015 Bollapalli .......... H04L 41/0206
709/227

FOREIGN PATENT DOCUMENTS

CN          103813329 A       5/2014

OTHER PUBLICATIONS

Fielding, Ed., et al., "Hypertext Transfer Protocol (HTTP/1.1): Semantics and Content," draft-ietf-httpbis-p2-semantics-26, Feb. 6, 2014, 101 pages.
Rosenberg, et al., "SIP: session Initiation Protocol," draft-ietf-sip-rfc2543bis-08.ps, Feb. 21, 2002, 194 pages.
"Enable Release Definition for RESTful Network API for Capability Discovery, Candidate Version 1.0—Jul. 1, 2013," Open Mobile Alliance OMA-ERELD-REST_NetAPI-CapabilityDiscovery-V1_0-20130701-C, 2013, 12 pages.

(Continued)

*Primary Examiner* — El Hadji M Sall
(74) *Attorney, Agent, or Firm* — Conley Rose, P.C.

(57) ABSTRACT

A method of service capability notification including receiving a service capability of a representational state transfer (REST) client and a request for a service capability of a target client from an application server, sending the service capability of the target client to the application server in response to the request, and sending the service capability of the REST client to a notification server so that the notification server is able to provide the service capability of the REST client to the target client.

10 Claims, 5 Drawing Sheets

(56) References Cited

OTHER PUBLICATIONS

"RESTful Network API for Capability Discovery, Candidate Version 1.0—Jul. 1, 2013," Open Mobile Alliance, OMA-TS-REST-NetAPI-CapabilityDiscovery-V1_0-20130701-C, 2013, 66 pages.
Rosenberg, et al., "SIP: Session Initiation Protocol," RFC 3261, Jun. 2002, 269 pages.
Fielding, Ed., et al., "Hypertext Transfer Protocol (HTTP/1.1) : Semantics and Content," RFC 7231, Jun. 2014, 101 pages.
Partial English Translation and Abstract of Chinese Patent Application No. CN103813329, Apr. 20, 2016, 5 pages.
Foreign Communication From a Counterpart Application, PCT Application No. PCT/CN2015/093798, English Translation of International Search Report dated Feb. 6, 2016, 6 pages.
Foreign Communication From a Counterpart Application, PCT Application No. PCT/CN2015/093798, English Translation of International Search Report dated Feb. 6, 2016, 5 pages.

* cited by examiner

//{serverRoot}/capabilitydiscovery/{apiVersion}/{userId}
                              └─ /subscriptions
                                    └─ /{subscriptionId}

| Resource | URL, Base URL | Data Structure | HTTP verbs | | | |
|---|---|---|---|---|---|---|
| | | | GET | PUT | POST | DELETE |
| All subscriptions to service discovery event notifications | /subscriptions | To be defined. | ✓ | | ✓ | |
| Individual subscription to service discovery event notifications | /subscriptions/{subscriptionId} | To be defined. | ✓ | | | ✓ |

METHOD OF SERVICE CAPABILITY NOTIFICATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Representational state transfer (REST) is an abstraction of the architecture of the World Wide Web. More precisely, REST is an architectural style including a coordinated set of architectural constraints applied to components, connectors, and data elements within a distributed hypermedia system. REST ignores the details of component implementation and protocol syntax in order to focus on the roles of components, the constraints upon their interaction with other components, and their interpretation of significant data elements.

The REST architectural style may be applied to the development of web services as an alternative to other distributed-computing specifications such as, for example, Simple Object Access Protocol (SOAP). One can characterize web services as "RESTful" if they conform to certain architectural constraints involving or relating to a client-server model, a stateless protocol, a web cache, a layered system, code on demand (optional), and a uniform interface.

In some circumstances, the REST architectural style may be applied to web application programming interfaces (APIs). Web APIs that adhere to the architectural constraints are called RESTful.

SUMMARY

In one embodiment, the disclosure includes a method of service capability notification. The method includes receiving, from an application server of a target client, a service capability of a representational state transfer (REST) client provided to the application server of the target client along with a request for a service capability of the target client from the REST client, and sending, to the target client, the service capability of the REST client.

In another embodiment, the disclosure includes a method of service capability notification. The method includes receiving, from an application server, a service capability of a representational state transfer (REST) client and a request for a service capability of a target client, sending, to the application server, the service capability of the target client in response to the request, and sending, to a notification server, the service capability of the REST client so that the notification server is able to provide the service capability of the REST client to the target client.

In yet another embodiment, the disclosure includes a notification server. The notification server includes a processor operably coupled to a memory and a notification module stored in the memory that, when executed by the processor is configured to receive, from Application Programming Interface (API) server of a target client, a service capability of a representational state transfer (REST) client provided to the API server of the target client along with a request for a service capability of the target client by the REST client, and send, to the target client, the service capability of the REST client using a notification channel established by the target client at startup.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for efficient service capability notification in a REST system. As will be more fully explained below, the system and methods disclosed herein permit a RESTful client and a target client to obtain the service capability of the other without each client having to send their own service capability request to the other. In other words, the RESTful client is able to obtain the service capability of the target client and to notify the target client of the RESTful client's service capabilities using a single service capability request. Because one service capability request is used to provide service capability information to two different clients, network resources are more efficiently utilized.

Figure 1:
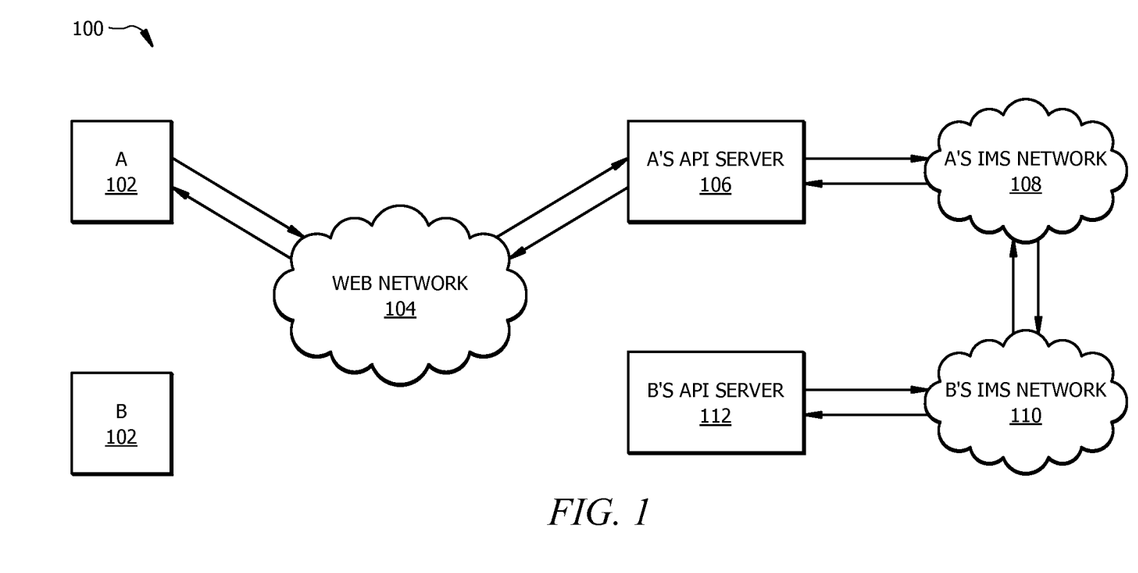
FIG. 1 is a schematic diagram of a first client discovering the capability of a second client in a REST system.

FIG. 1 is a schematic diagram of a REST system 100. The REST architecture and API are described in more detail in the RESTful Network API for Capability Discovery, Candidate Version 1.0, specification published Jul. 1, 2013, and the Enabler Release Definition for RESTful Network API for Capability Discovery, Candidate Version 1.0, specification published Jul. 1, 2013, both of which are incorporated herein by reference as if reproduced in their entirety.

As shown in FIG. 1, the REST system 100 includes one or more computing devices, which for convenience will be referred to herein as clients 102. In some embodiments, one or both of the clients 102 is a personal computer (PC), a mobile device (e.g., smart phone, tablet computer, etc.). In some embodiments, each client 102 includes one or more APIs used to handle a web application. By way of example, the web application is a web application used to make video calls (e.g., Microsoft Skype™) or to otherwise facilitate communication between the clients 102.

Each client 102 includes a browser (e.g., Mozilla Firefox®, Google Chrome®, Microsoft Internet Explorer®, or Apple Safari®). As well known in the art, a browser is a software application for retrieving, presenting, and traversing information resources on the World Wide Web. Some web browsers utilize a technology referred to a Web Real-Time Communications (WebRTC). WebRTC is an API drafted by the Worldwide Web Consortium (W3C) that supports browser-to-browser application for video-calling, video chat, peer-to-peer (P2P) file sharing, and the like, without requiring a plugin in the browser. If the browser of each client 102 includes support for WebRTC, the clients 102 are able to engage in browser-to-browser communications without the need for a plugin.

As shown in FIG. 1, one of the clients 102 is labeled client A and another of the clients is labeled client B. When client A, which may or may not be RESTful, wants to determine the service capability of client B (e.g., the target client), which may or may not be RESTful, client A sends a service capability request message through web network 104 to A's API server 106. A's API server 106 is, for example, a WebRTC user network interface (UNI) server. In some embodiments, the service capability request message sent by client A is in a Hypertext Transfer Protocol (HTTP) format. A's API server 106 is configured to convert the service capability request message into a session initiation protocol (SIP) format.

A's API server 106 sends the service capability request message to A's Internet Protocol (IP) multimedia system (IMS) network 108. In some cases, the service capability request message sent to A's IMS network 108 is a standard SIP OPTIONS request. The OPTIONS request is described in more detail in the Internet Engineering Task Force (IETF) document, draft-ietf-sip-rfc2543bis-08.txt, published Feb. 21, 2002, and the Request for Comments (RFC) document, RFC 3261, published June 2002, both of which are incorporated herein by reference as if reproduced in their entirety. Notably, the OPTIONS message contains an indication of client A's capabilities.

If client A and client B have different carriers (e.g., AT&T, Verizon, T-Mobile, etc.), client B will have its own Internet Protocol (IP) multimedia system (IMS) network 110. In such circumstances, A's IMS network 108 sends the service capability request message to B's IMS network 110. B's IMS network 110 then sends the service capability message to B's API server 112, which knows of can determine the service capability of client B. B's API server 112 is, for example, a WebRTC user network interface (UNI) server. B's API server 112 responds to the service capability request message by sending a service capability response message, which contains an indication of client B's capabilities, to B's IMS network 110. B's IMS network 110 sends the service capability response message to A's IMS network 108, which then sends the service capability response message to A's API server 106. A's API server 106 is configured to convert the message from the SIP format to the HTTP format.

A's API server 106 sends the service capability response message through the web network 104 to client A. Client A is then able to extract or determine B's capabilities from the service capability response message. Unfortunately, A's capabilities are not used during the service capability discovery process of FIG. 1 even though A's capabilities were included in the OPTIONS message. This is a waste of network resources.

Figure 2:
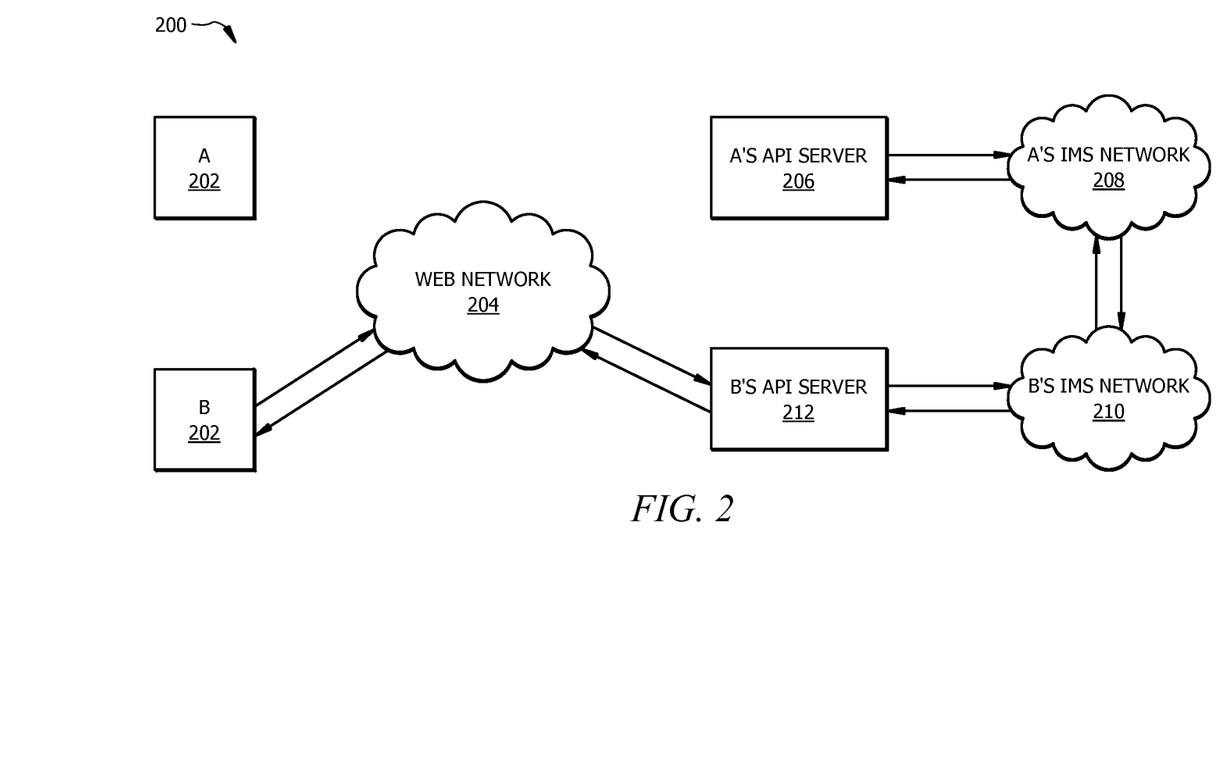
FIG. 2 is a schematic diagram of a second client discovering the capability of a first client in a REST system.

FIG. 2 is a schematic diagram of REST system 200. The REST system 200 includes one or more computing devices, which are referred to clients 202. In some embodiments, the clients 202 are configured similar to clients 102 in FIG. 1. When client B, which may or may not be RESTful, wants to determine the service capability of client A, which may or may not be RESTful, client B sends a service capability request message through web network 204 to B's API server 212. B's API server 212 is, for example, a WebRTC UNI server. In some embodiments, the service capability request message sent by client B is in an HTTP format. B's API server 212 is configured to convert the service capability request message into a SIP format.

B's API server 212 sends the service capability request message to B's IMS network 210. In some cases, the service capability request message sent to B's IMS network 210 is a standard SIP OPTIONS request. As noted above, the OPTIONS request is described in more detail in the Internet Engineering Task Force (IETF) document, draft-ietf-sip-rfc2543bis-08.txt, published Feb. 21, 2002, and the Request for Comments (RFC) document, RFC 3261, published June 2002, both of which are incorporated herein by reference as if reproduced in their entirety. Notably, the OPTIONS message contains an indication of client B's capabilities.

If client A and client B have different carriers (e.g., AT&T, Verizon, T-Mobile, etc.), client A will have its own IMS network 208. In such circumstances, B's IMS network 210 sends the service capability request message to A's IMS network 208. A's IMS network 208 then sends the service capability message to A's API server 206, which knows or can determine the service capability of client A. A's API server 206 is, for example, a WebRTC UNI server. A's API server 206 responds to the service capability request message by sending a service capability response message, which contains an indication of client A's capabilities, to A's IMS network 208. A's IMS network 208 sends the service capability response message to B's IMS network 210, which then sends the service capability response message to B's API server 212. B's API server 212 is configured to convert the message from the SIP format to the HTTP format.

B's API server 212 sends the service capability response message through the web network to client B. Client B is then able to extract or determine A's capabilities from the service capability response message. Unfortunately, B's capabilities are not used during the service capability discovery process of FIG. 2 even though B's capabilities were included in the OPTIONS message. Once again, this is a waste of network resources.

From the foregoing, it should be recognized that two service discovery processes need to be carried out before client A and client B know each other's service capability. In other words, the service discovery capability process is carried out twice, once by client A and once by client B. Because the service discovery process is performed separately for client A and for client B, the overall capability discovery process is inefficient.

Figure 3:
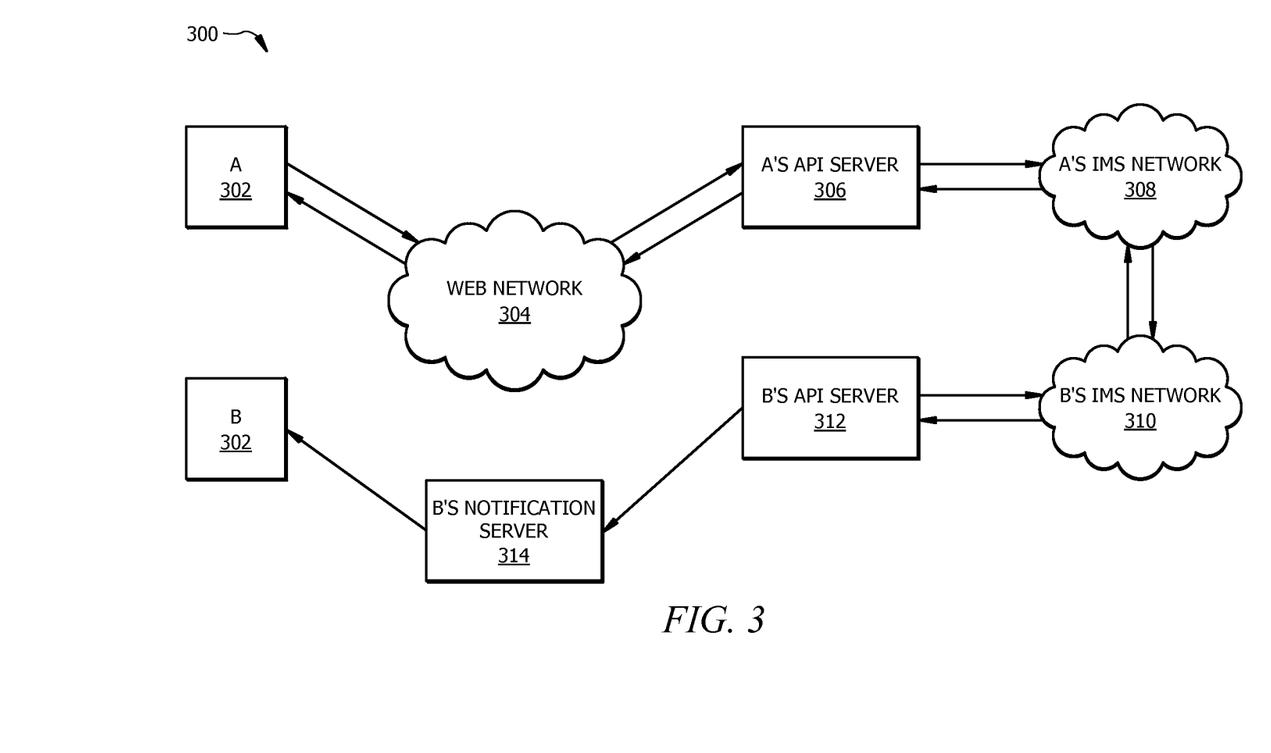
FIG. 3 is a schematic diagram of an embodiment of service capability notification in a REST system.

FIG. 3 is schematic diagram of an embodiment of service capability notification in a REST system 300 that solves the foregoing problems. The REST system 300 includes one or more computing devices, which are referred to clients 302. In some embodiments, the clients 302 are configured similar to clients 102 and 202 in FIGS. 1-2. When client A, which may or may not be RESTful, wants to determine the service capability of client B, which may or may not be RESTful, client A sends a service capability request message through web network 304 to A's API server 306. In some embodiments, the web network 304 is configured similar to the web network 104, 204 in FIGS. 1-2. In some embodiments, A's API server 306 is configured similar to A's API server 106, 206 in FIGS. 1-2. In some embodiments, the service capability request message sent by client A is in an HTTP format. A's API server 306 is configured to convert the service capability request message into a SIP format.

A's API server 306 sends the service capability request message to A's IMS network 308. In some embodiments, A's IMS network 308 is configured similar to A's IMS network 108, 208 in FIGS. 1-2. In some cases, the service capability request message sent to A's IMS network 308 is a SIP OPTIONS request incorporating an indication of A's service capability. By way of example, the indication indicates that client A is WebRTC-enabled or configured client. The OPTIONS request is described in more detail in the Internet Engineering Task Force (IETF) document, draft-ietf-sip-rfc2543bis-08.txt, published Feb. 21, 2002, and the Request for Comments (RFC) document, RFC 3261, published June 2002, both of which are incorporated herein by reference as if reproduced in their entirety.

If client A and client B have different carriers (e.g., AT&T, Verizon, T-Mobile, etc.), client B will have its own IMS network 310. In some embodiments, B's IMS network 310 is configured similar to B's IMS network 110, 210 in FIGS. 1-2. A's IMS network 308 sends the service capability request message to B's IMS network 310. B's IMS network 310 then sends the service capability message to B's API server 312, which knows or can determine the service capability of client B. B's API server 312 is, for example, a WebRTC UNI server.

As shown in FIG. 3, B's API server 312 responds to the service capability request message in two different ways. B's API server 312 sends a service capability response message, which contains an indication of client B's capabilities, to B's IMS network 310. B's IMS network 310 sends the service capability response message to A's IMS network 308, which then sends the service capability response message to A's API server 306. A's API server 306 sends the service capability response message through the web network 304 to client A. Client A is then able to extract or determine B's capabilities from the service capability response message.

B's API server 312 also sends the service capability of client A to a notification server 314 of client B as shown in FIG. 3. B's notification server 314 then sends or relays the service capability of client A to client B. As such, client B is aware of the service capability of client A without client B having to generate and send a service capability request message of its own. Because the service capability of client A is provided to client B by B's notification server 314, the service capability process of, for example, FIG. 2 is eliminated. In other words, client A and client B are able to know each other's service capability after a single service capability request process is performed.

In some embodiments, B's API server 312 sends the service capability of client A to B's notification server 314 using a message in an HTTP format. In some embodiments, B's notification server 314 also sends the service capability of client A to client B using a message in an HTTP format. In some embodiments, B's notification server 314 is configured to utilize HTTP long polling (e.g., a long polling protocol) such that a "heartbeat" exists between B's notification server 314 and client B. In other words, continual two-way communications exist between B's notification server 314 and client B. In some embodiments, other two way communications are established such as, for example, Bidirectional-streams Over Synchronous HTTP (BOSH), asynchronous JavaScript+Extensible Markup Language (XML) (AJAX), and so on.

In some embodiments, B's API server 312 sends the service capability of client A to B's notification server 314 using a notification channel established on B's notification server 314 when client B starts. For example, client B creates (or requests the creation of) a notification channel on B's notification server 314 when client B is started. Client B also subscribes to service discovery from B's API server 312.

Although not shown in FIG. 3, it should be recognized that client A also benefits from a notification server similar to B's notification server 314. In other words, while not shown in FIG. 3, in some embodiments a notification server associated with client A is disposed between client A and A's API server 306. As such, the service capability of client B is provided to client A by A's notification server in a manner similar to that described above with regard to B's notification server 314. Because the service capability of client B is provided to client A by A's notification server in such an embodiment, the service capability process of, for example, FIG. 1 is eliminated. Therefore, client A and client B are able to know each other's service capability after a single service capability request process is performed.

Figure 4:
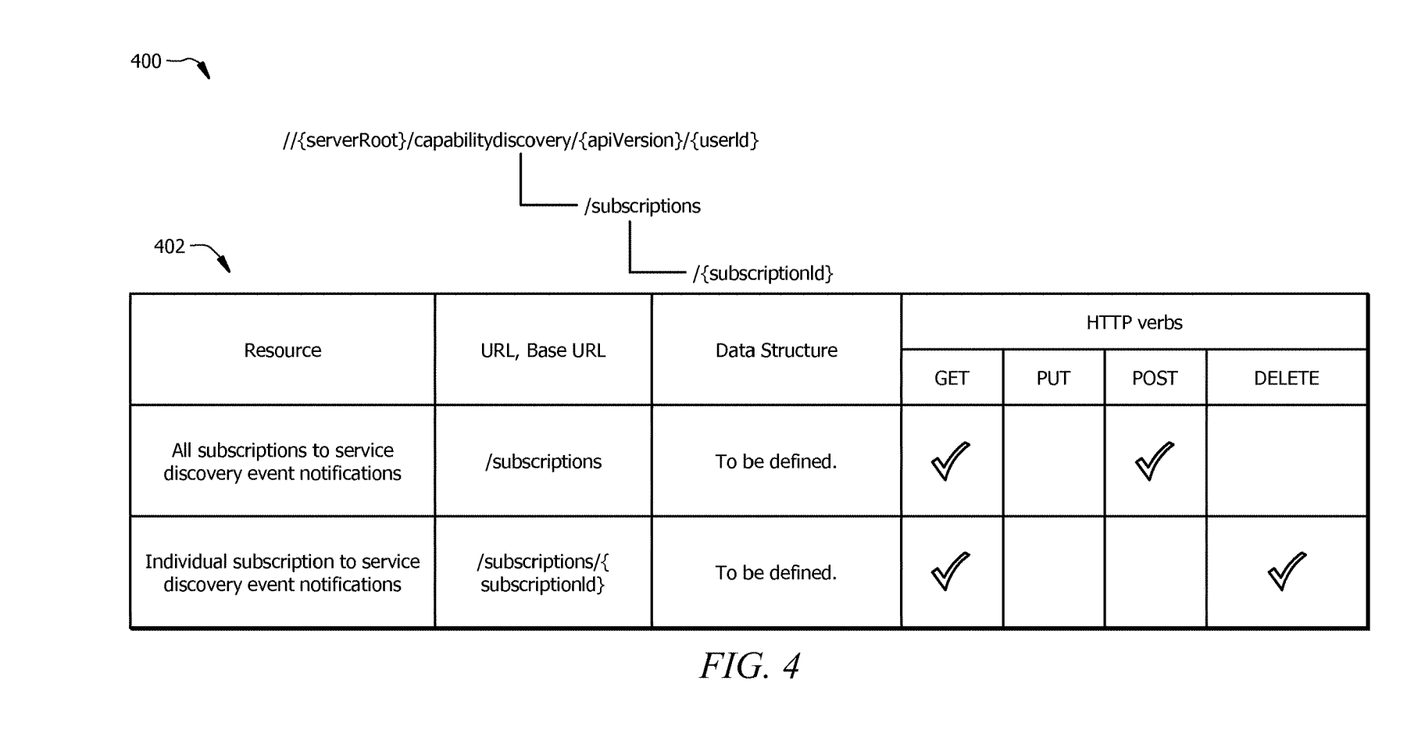
FIG. 4 depicts an embodiment of a resource for creating the subscription of the service discovery.

In some embodiments, the HTTP messaging described herein is performed using particular HTTP operations or verbs. For example, the resource capability request message sent by client A to A's API server 306, the capability of client A send by B's API server 312 to B's notification server 314, and the capability of client A sent by B's notification server 314 to client B are implemented using the HTTP operations GET, POST, and/or DELETE as shown in the root structure 400 and chart 402 of FIG. 4. The GET, POST, and DELETE functions are described in more detail in the Internet Engineering Task Force (IETF) document Hypertext Transfer Protocol (HTTP/1.1): Semantics and Content, draft-ietf-httpbis-p2-semantics-26, published Feb. 6, 2014, and the Request for Comments (RFC) document, Hypertext Transfer Protocol (HTTP/1.1): Semantics and Content, RFC 7231, published June 2014, both of which are incorporated herein by reference as if reproduced in their entirety.

Figure 5:
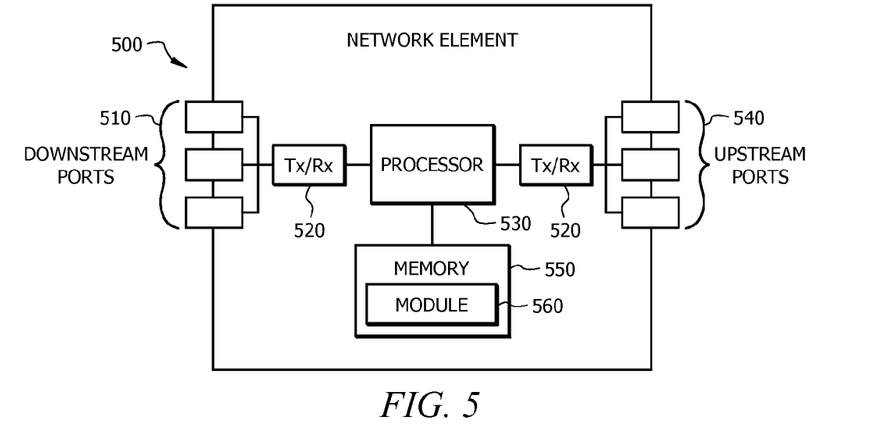
FIG. 5 is a schematic diagram of an embodiment of a computing device capable of facilitating the service capability notification in the REST system of FIG. 3.

FIG. 5 is a schematic diagram of an embodiment of a server 500 used to send and receive messages or information through at least a portion of the REST system 300 shown in FIG. 3. At least some of the features/methods described in the disclosure are implemented in the server 500. For instance, the features/methods of the disclosure are implemented in hardware, firmware, and/or software installed to run on the hardware. The server 500 is any device that transports data through a network, system, and/or domain. Moreover, the terms server, computer, logic device, and/or similar terms are interchangeably used to generally describe a server and do not have a particular or special meaning unless otherwise specifically stated and/or claimed within the disclosure.

In one embodiment, the server 500 is an apparatus configured to participate in the capability discovery process depicted in FIG. 3. In addition, components or functions of the server 500 are implemented in and/or integrated within the clients 102 (e.g., client A, client B), A's API server 306, B's API server 312, B's notification server 314, or devices in A's IMS network 308 or B's IMS network 310 as described and illustrated in FIG. 3.

The server 500 comprises one or more downstream ports 510 coupled to a transceiver (Tx/Rx) 520, which are transmitters, receivers, or combinations thereof. The Tx/Rx 520 transmits and/or receives messages or information from other network devices (e.g., servers, etc.) via the downstream ports 510. Similarly, the server 500 comprises another Tx/Rx 520 coupled to a plurality of upstream ports 540, wherein the Tx/Rx 520 transmits and/or receives messages or information from other network devices via the upstream ports 540. The downstream ports 510 and/or the upstream ports 520 include electrical and/or optical transmitting and/or receiving components.

A processor 530 is coupled to the Tx/Rx 520 and is configured to process the messages or information and/or determine which servers to send (e.g., transmit) the messages or information to. In an embodiment, the processor 530 comprises one or more multi-core processors and/or memory modules 550, which function as data stores, buffers, etc. In some embodiments, the processor 530 is implemented as a general processor or as a part of one or more application specific integrated circuits (ASICs), field-programmable gate arrays (FPGAs), and/or digital signal processors (DSPs). Although illustrated as a single processor, the processor 530 is not so limited and may be multiple processors. The processor 530 is configured to the adaptive and dynamic allocation of media resources described herein.

FIG. 5 illustrates that a memory 550 is coupled to the processor 530 and is a non-transitory medium configured to store various types of data. In some embodiments, memory 550 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory 550 is used to house the instructions for carrying out the various example embodiments described herein. In one example embodiment, the memory 550 comprises a module 560. In an embodiment, the module 560 represents a notification module (e.g., a service discovery module) disposed within B's notification server 314 as shown in FIG. 3. The notification module 560 is capable of implementing the notification channel permitting B's API server 312 and client B to exchange messages. In other words, the notification module 560 permits the B's API server 312 and client B to communicate with each other through B's notification server 314 regarding, for example, the service capability of client A. In some embodiments, the memory 550 stores instructions capable of implementing the service capability notification method 600 of FIG. 6. In some embodiments, the memory 550 stores instructions capable of implementing the service capability notification method 700 of FIG. 7.

It is understood that by programming and/or loading executable instructions onto the server 500, at least one of the processor 530, the cache, and the long-term storage are changed, transforming the server 500 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 6:
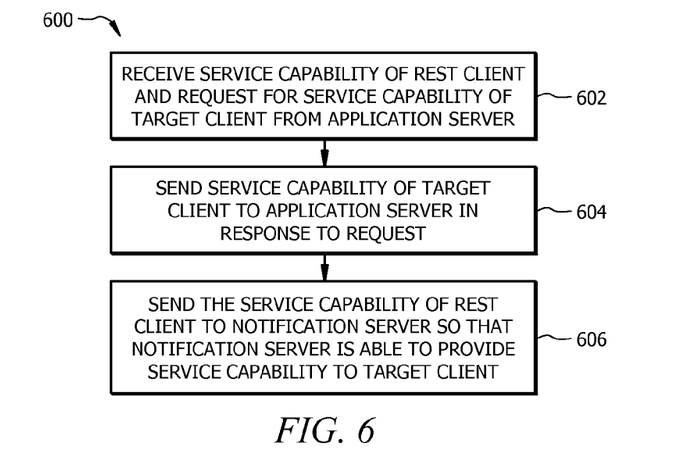
FIG. 6 is a flowchart of an embodiment of a service capability notification method utilizing the REST system of FIG. 3.

FIG. 6 is a flowchart of an embodiment of a service capability notification method 600 utilizing the REST system 300 of FIG. 3. The method 600 is implemented when, for example, a REST client wants to determine the service capability of a target client. In block 602, a service capability of a REST client (e.g., client A in FIG. 3) and a request for a service capability of a target client (e.g., client B in FIG. 3) are received from an application server. In block 604, the service capability of the target client is sent to the application server in response to the request. In block 606, the service capability of the REST client is sent to the notification server so that the notification server is able to provide the service capability of the REST client to the target client.

Figure 7:
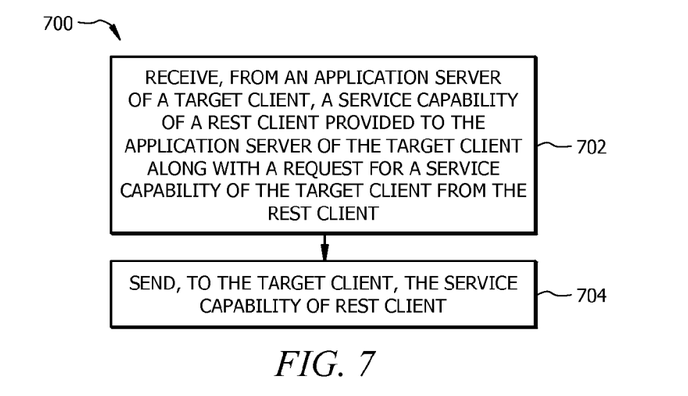
FIG. 7 is a flowchart of an embodiment of a service capability notification method utilizing the REST system of FIG. 3.

FIG. 7 is a flowchart of an embodiment of a service capability notification method 700 utilizing the REST system 300 of FIG. 3. The method 600 is implemented when, for example, a REST client has requested information regarding the service capability of a target client. In block 702, a service capability of a REST client (e.g., client A in FIG. 3) is received from the application server of the target client (e.g., client B in FIG. 3). The service capability of the REST client was provided to the application server of the target client along with a request for a service capability of the target client from the REST client. In block 704, the service capability of the REST client is sent to the target client.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. A method of service capability notification, comprising:
receiving, from an application server of a target client, a service capability of a representational state transfer (REST) client provided to the application server of the target client at about a same time as a request for a service capability of the target client from the REST client, the service capability of the target client indicating whether or not the target client is RESTful, the application server being a Web Real-Time Communications (WebRTC) user network interface (UNI) server and the REST client being associated with a first Internet Protocol (IP) multimedia system (IMS) network; and
sending, to the target client, the service capability of the REST client, the target client being associated with a second IP IMS network different from the first IP IMS network.

2. The method of claim 1, wherein the application server of the target client comprises an Application Programming Interface (API) server.

3. The method of claim 1, wherein the service capability of the REST client is sent to the target client after the application server of the target client has responded to the request for the service capability of the target client by the REST client.

4. The method of claim 1, wherein the service capability of the REST client is sent to the target client before the application server of the target client has responded to the request for the service capability of the target client by the REST client.

5. The method of claim 1, wherein the service capability of the REST client is sent to the target client using a notification channel established when the target client is started.

6. The method of claim 1, wherein the service capability of the REST client and the request for the service capability of the target client are packaged in a session initiation protocol (SIP) OPTIONS message.

7. The method of claim 1, wherein the application server comprises a Web Real-Time Communications (WebRTC) user network interface (UNI) server, wherein the REST client is associated with a first Internet Protocol (IP) multimedia system (IMS) network, and wherein the target client is associated with a second IP IMS network different from the first IP IMS network.

8. A notification server, comprising:
a processor operably coupled to a memory; and
a notification module stored in the memory that, when executed by the processor is configured to:
receive, from an application server of a target client, a service capability of a representational state transfer (REST) client provided to the application server of the target client at about a same time as a request for a service capability of the target client by the REST client, the service capability of the target client indicating whether or not the target client is RESTful, the application server being a Web Real-Time Communications (WebRTC) user network interface (UNI) server and the REST client being associated with a first Internet Protocol (IP) multimedia system (IMS) network; and
send, to the target client, the service capability of the REST client using a notification channel established by the target client at startup, the target client being associated with a second IP IMS network different from the first IP IMS network.

9. The notification server of claim 8, wherein the service capability of the REST client is sent to the target client simultaneously with a response by the application server of the target client to the request for the service capability of the target client by the REST client.

10. The notification server of claim 8, wherein the service capability of the REST client and the request for the service capability of the target client are packaged in a session initiation protocol (SIP) OPTIONS message.

* * * * *

UNITED STATES PATENT AND TRADEMARK OFFICE
CERTIFICATE OF CORRECTION

PATENT NO. : 10,218,766 B2  
APPLICATION NO. : 14/532503  
DATED : February 26, 2019  
INVENTOR(S) : Xinmin Ding et al.

Page 1 of 1

It is certified that error appears in the above-identified patent and that said Letters Patent is hereby corrected as shown below:

On the Title Page

Page 2, item (56), Other Publications, Lines 13-15, should read:
Foreign Communication From A Counterpart Application, PCT Application No.
PCT/CN2015/093798, English Translation of Written Opinion dated Feb. 6, 2016, 5 pages.

Signed and Sealed this  
Fourteenth Day of May, 2019

Andrei Iancu  
*Director of the United States Patent and Trademark Office*